United States Patent
Ishigaya et al.

(10) Patent No.: US 11,575,503 B2
(45) Date of Patent: Feb. 7, 2023

(54) BLOCKCHAIN CONTROL METHOD

(71) Applicant: Cowry Inc., Tokyo (JP)

(72) Inventors: Tsutomu Ishigaya, Tokyo (JP); Ryo Sasada, Tokyo (JP); Takaaki Iizuka, Tokyo (JP)

(73) Assignee: COWRY INC., Tokyo (JP)

( * ) Notice: Subject to any disclaimer, the term of this patent is extended or adjusted under 35 U.S.C. 154(b) by 0 days.

(21) Appl. No.: 17/308,677

(22) Filed: May 5, 2021

(65) Prior Publication Data

US 2021/0258142 A1 Aug. 19, 2021

Related U.S. Application Data

(63) Continuation of application No. PCT/JP2019/026473, filed on Jul. 3, 2019.

(30) Foreign Application Priority Data

Nov. 14, 2018 (JP) .............................. JP2018-213408

(51) Int. Cl.
*H04L 29/06* (2006.01)
*H04L 9/06* (2006.01)
(Continued)

(52) U.S. Cl.
CPC ............ *H04L 9/0618* (2013.01); *H04L 9/085* (2013.01); *H04L 9/50* (2022.05); *H04L 2209/56* (2013.01); *H04L 2209/60* (2013.01)

(58) Field of Classification Search
CPC ... H04L 9/0618; H04L 9/085; H04L 2209/60; H04L 2209/38; H04L 2209/56
See application file for complete search history.

(56) References Cited

U.S. PATENT DOCUMENTS 6,601,172 B1 7/2003 Epstein
6,839,837 B1 * 1/2005 Morishita ............. G06F 21/602
380/44
(Continued)

FOREIGN PATENT DOCUMENTS

JP 2003280972 A 10/2003
JP 2010004379 A 1/2010
(Continued)

OTHER PUBLICATIONS

Antonopoulos, "mastering bitcoin, Unlocking Digital Crypto-Currencies", O'Reilly Media, Apr. 2014 (Year: 2014).*

*Primary Examiner* — Taghi T Arani
*Assistant Examiner* — Lin Chang
(74) *Attorney, Agent, or Firm* — Muncy, Geissler, Olds & Lowe, P.C.

(57) ABSTRACT

A privileged node holds a secret key (SKEY), and normal nodes each hold a public key (PKEY). The normal nodes each include a transaction inputting unit that receives transaction data (TDATA), a transaction transmitting unit that transmits the TDATA, a transaction managing unit that manages a transaction history in a form of blockchain, and a block receiving unit that receives blocks from the privileged node. The privileged node includes a transaction receiving unit that receives TDATA from each of the normal nodes, a block generating unit that generates a signature value (SIG) on the basis of a SKEY, and generates a block containing TDATA and the SIG, and a block transmitting unit that transmits blocks. The transaction managing unit adds a block to the blockchain on condition that the authenticity of the SIG in the block is confirmed by using the PKEY.

7 Claims, 10 Drawing Sheets

(51) Int. Cl.
    *H04L 9/08*     (2006.01)
    *H04L 9/00*     (2022.01)

(56) References Cited

U.S. PATENT DOCUMENTS

| | | | | |
|---|---|---|---|---|
| 10,713,727 | B1* | 7/2020 | Floyd | G07C 5/085 |
| 10,790,976 | B1* | 9/2020 | Raevsky | G06Q 20/065 |
| 2003/0187885 | A1 | 10/2003 | Miyazaki et al. | |
| 2007/0239615 | A1 | 10/2007 | Matsuzaki et al. | |
| 2012/0201379 | A1* | 8/2012 | Fuchs | H04L 9/0897 |
| | | | | 380/255 |
| 2014/0205092 | A1* | 7/2014 | Hartley | H04L 9/0897 |
| | | | | 380/44 |
| 2016/0028719 | A1* | 1/2016 | Kobayashi | H04L 9/0894 |
| | | | | 713/156 |
| 2017/0351849 | A1* | 12/2017 | Dottax | H04L 9/3231 |
| 2017/0372278 | A1* | 12/2017 | Frolov | H04L 9/50 |
| 2018/0139278 | A1* | 5/2018 | Bathen | H04L 9/3236 |
| 2019/0123580 | A1* | 4/2019 | Bindea | G05B 13/026 |
| 2019/0132350 | A1* | 5/2019 | Smith | G06F 21/577 |
| 2019/0199516 | A1* | 6/2019 | Carver | H04L 9/3297 |
| 2019/0347654 | A1* | 11/2019 | Lu | H04L 9/3239 |
| 2019/0378133 | A1* | 12/2019 | Deshpande | G06F 16/1805 |
| 2020/0134586 | A1* | 4/2020 | Wu | G06Q 20/367 |
| 2020/0167773 | A1* | 5/2020 | Cervenka | G06F 16/27 |
| 2020/0228318 | A1* | 7/2020 | Karame | H04L 9/0637 |
| 2021/0021424 | A1* | 1/2021 | Punal | H04L 9/3236 |
| 2021/0073212 | A1* | 3/2021 | Conley | G06Q 20/4014 |
| 2021/0135854 | A1* | 5/2021 | Karame | G06Q 20/3678 |

FOREIGN PATENT DOCUMENTS

| | | |
|---|---|---|
| JP | 2010187419 A | 8/2010 |
| JP | 2017204070 A | 11/2017 |
| JP | 2018160828 A | 10/2018 |
| WO | WO-2005/104430 A1 | 11/2005 |

* cited by examiner

BLOCKCHAIN CONTROL METHOD

CROSS-REFERENCE TO RELATED APPLICATIONS

This application is a continuation application of International Application No. PCT/JP2019/026473, filed on Jul. 3, 2019, which claims priority to and the benefit of Japanese Patent Application No. 2018-213408, filed on Nov. 14, 2018. The contents of these applications are incorporated herein by reference in their entirety.

BACKGROUND OF INVENTION

1. Field

The present invention relates to a technology of a blockchain, and in particular to a technology for checking the authenticity of electronic transactions based on a blockchain.

2. Description of Related Art

A blockchain is a system supporting cryptocurrencies such as Bitcoin and Ethereum (refer to Patent Literature 1). A blockchain is a transaction ledger shared by a plurality of communication nodes using peer-to-peer technology.

A user that is a transactor broadcasts transaction data to a communication network. A user called a miner injects transaction data and a nonce into a hash function to search for a hash (hereinafter referred to as a "proper hash") that satisfies predetermined conditions. A plurality of miners compete to find a proper hash as quickly as possible. When a proper hash is found, the transaction data are registered in a blockchain. Although it is difficult to find a nonce with which a proper hash can be created, it is easy to check whether or not a hash is proper on the basis of a nonce that is once found. The difficulty of finding proper hashes and the easiness of checking hashes make a blockchain difficult to tamper with.

RELATED ART LIST

Patent Literature 1: JP 2018-160828 A

Because a blockchain is a distributed system that is not controlled by a center (server), a transactor can conduct a transaction without disclosing his/her identity (name, etc.). Because, however, a blockchain does not include a "center", an event called a "fork" may occur in some cases. Specifically, in a case here a miner A and a miner B have found two proper hashes for one block, two blocks are created, and the blockchain thus forks into two branches. A blockchain is premised on developing along a single path without a fork. A fork is normally resolved by keeping a longer chain while invalidating a shorter chain. Because invalidation of a shorter chain means invalidation of some transaction data, the possibility of occurrence of a fork may impair the stability of transactions.

In a typical blockchain, the difficulty of finding a proper hash (hereinafter referred to as "mining difficulty") is set to be high in order to reduce occurrence of a fork. As the mining difficulty is higher, however, the smoothness of transactions is decreased.

SUMMARY OF INVENTION

The present invention has been achieved on the basis of recognition of the aforementioned problems, and a chief object thereof is to provide a technology for both stabilizing and facilitating transactions in a blockchain.

For making the points of the present invention clearer, a typical system of a blockchain and disadvantages thereof will be described later in detail.

A blockchain system according to an aspect of the present invention includes a transaction network including a plurality of normal nodes, and a privileged node connected to the transaction network.

The privileged node holds a secret key. The normal nodes each hold a public key in advance.

The normal nodes each include a transaction inputting unit that receives input of transaction data of a result of a transaction in a cryptocurrency, a transaction transmitting unit that transmits transaction data to the transaction network, a transaction managing unit that manages a transaction history in a form of a blockchain, and a block receiving unit that receives a block from the privileged node.

The privileged node includes a transaction receiving unit that receives transaction data from the normal nodes, a block generating unit that generates a signature value on the basis of the secret key, and generates a block as a data set containing transaction data and the signature value, and a block transmitting unit that transmits the block to the transaction network.

The transaction managing unit of each of the normal nodes adds a block received from the privileged node to the blockchain on condition that the authenticity of the signature value in the block is confirmed by using the public key.

A server (a privileged node) according to an aspect of the present invention is connected to a transaction network including a plurality of normal nodes.

The normal nodes are communication terminals each holding a public key associated with a secret key of the server in advance, and managing history of transactions in a cryptocurrency in a form of blockchain.

The server includes a transaction receiving unit that receives transaction data of a result of a transaction in a cryptocurrency from each of the normal nodes, a block generating unit that generates a signature value from the secret key, and generates a block as a data set containing transaction data and the signature value, and a block transmitting unit that transmits the block to the transaction network.

The present invention allows both of stabilizing and facilitating transactions in a blockchain.

DETAILED DESCRIPTION

A typical blockchain includes no centralized privileged node (server) to generally control the operation thereof. A blockchain expands as many and unspecified miners compete to search for proper hashes. The search for proper hashes is called "mining". Hereinafter, generation of a new block through "mining" will be referred to as "block generation". In a typical blockchain, a miner that got ahead of the mining competition generates a block.

In a blockchain presented in the present embodiment, a privileged node (server) having a central role in the operation thereof is provided. A single privileged node, instead of many and unspecified miners, generates blocks.

Figure 3:
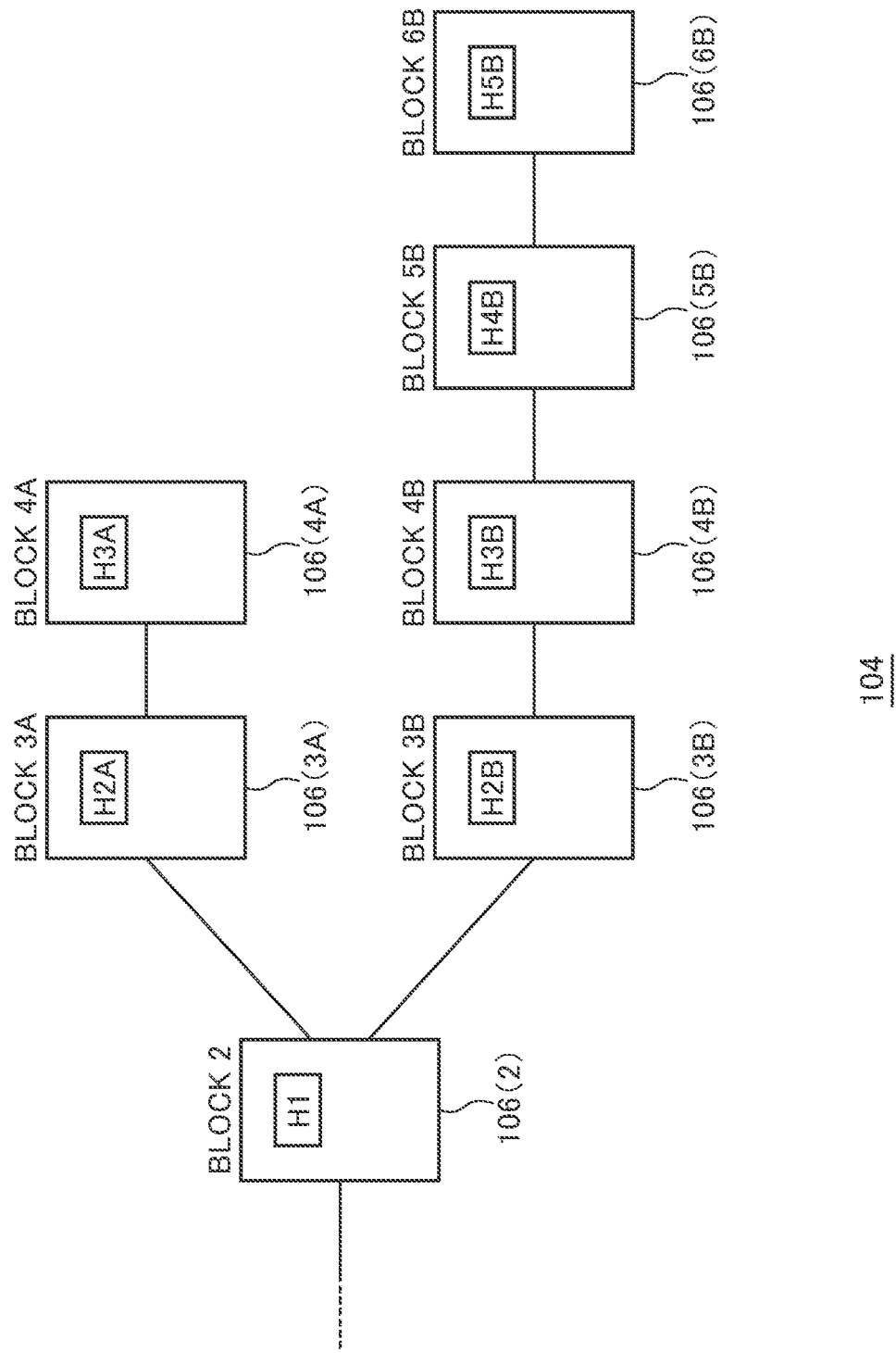
FIG. 3 is a schematic diagram for explaining how a fork occurs in a blockchain system.
Figure 4:
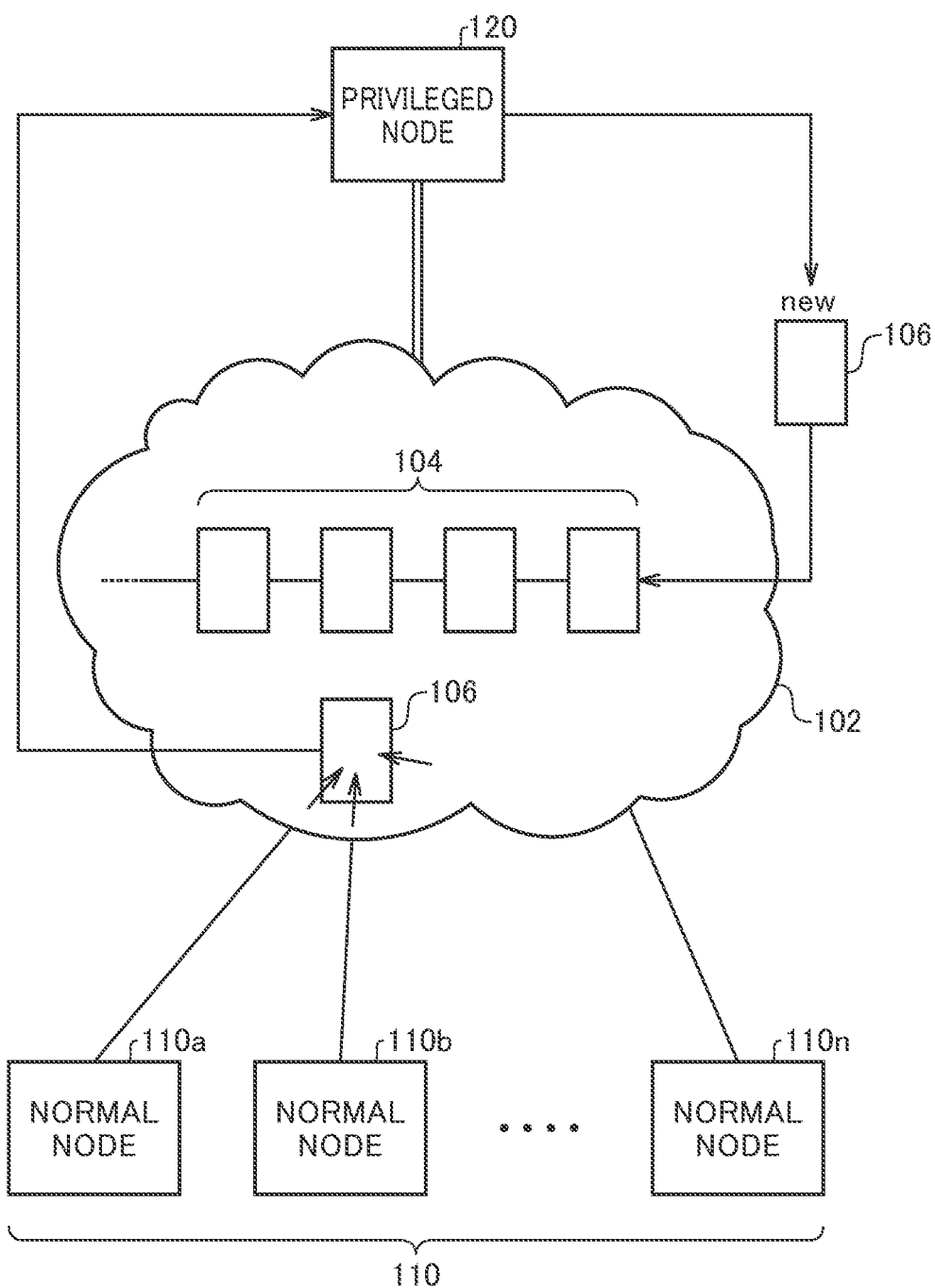
FIG. 4 is an outline diagram of a blockchain system according to an embodiment.

An outline of a typical blockchain will be described below with reference to FIGS. 1 and 2. With reference to FIG. 3, a mechanism of generation of a "fork" in a typical blockchain and adverse effects caused thereby will be pointed. With reference to FIG. 4 and subsequent figures, a novel blockchain system according to the present embodiment will be described in detail.

Figure 1:
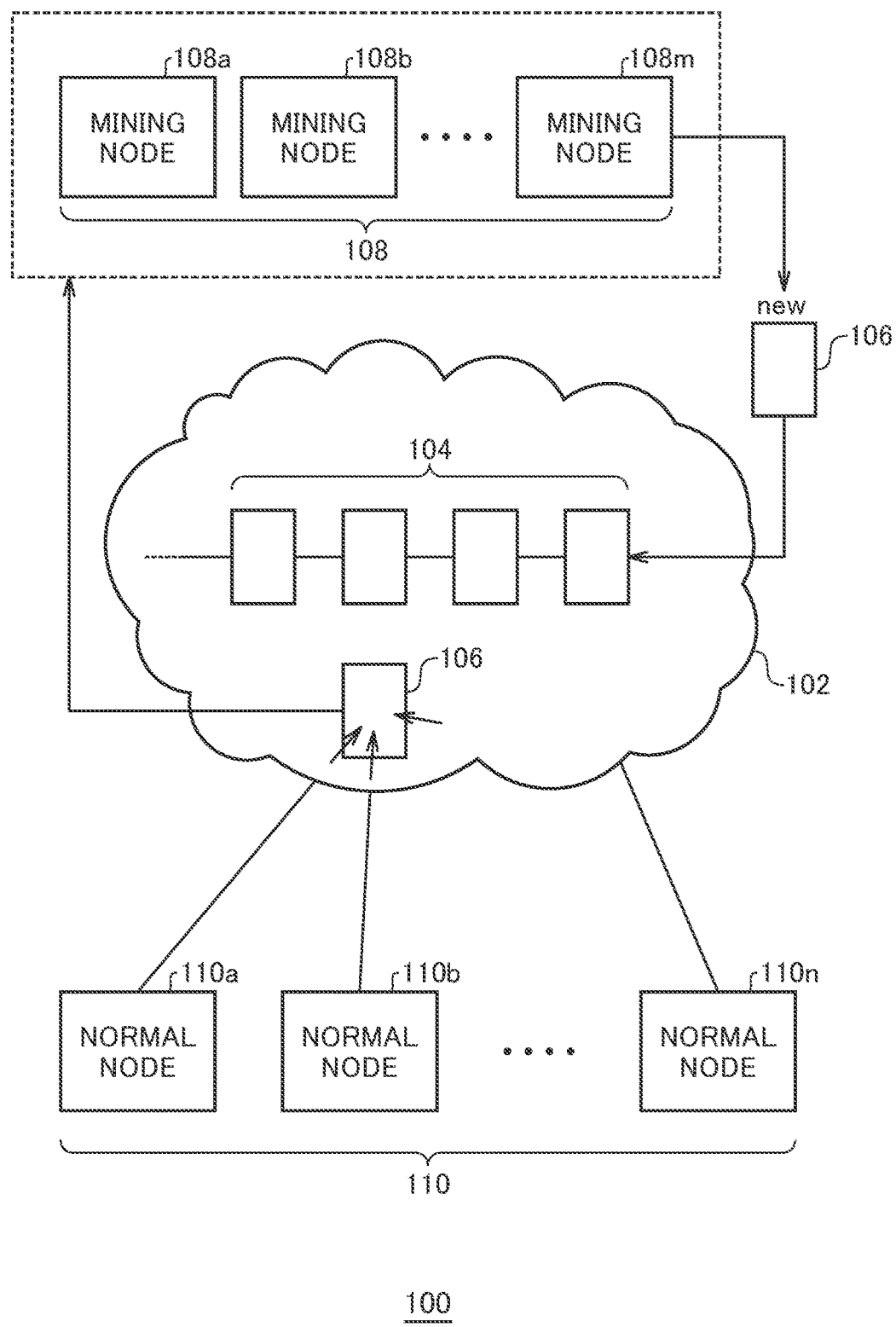
FIG. 1 is an outline diagram illustrating a typical blockchain system.

FIG. 1 is an outline diagram of a typical blockchain system 100.

The blockchain system 100 includes a number of normal nodes 110a, 110b, . . . , 110n (hereinafter referred to as "normal nodes 110") and a number of mining nodes 108a, 108b, . . . , 108n (hereinafter referred to as "mining nodes 108"), which are connected peer-to-peer via a transaction network 102. The transaction network 102 is formed in an open communication network such as the Internet.

The normal nodes 110 are nodes to be subjects of transactions, such as personal wallets and cryptocurrency exchanges. The mining nodes 108 are communication terminals used by miners for block generation (mining). The normal nodes 110 may have the functions of the mining nodes 108.

A blockchain 104 is formed in the transaction network 102. Data entities of the blockchain 104 are locally saved in each of the normal nodes 110 and the mining nodes 108. When the blockchain 104 is updated, updating information is broadcast to the transaction network 102. The normal nodes 110 and the mining nodes 108 updates the blockchain 104 saved therein in accordance with the updating information. In this manner, the same blockchain 104 is synchronously shared over the entire transaction network 102.

The blockchain 104 has a data structure including a chain of a large number of blocks 106. A block 106 is a data unit recording one or more transaction data. Each time a normal node 110 executes a cryptocurrency transaction (remittance), the normal node 110 broadcasts data indicating details of the transaction (hereinafter referred to as "transaction data") to the transaction network 102. The mining nodes 108 perform mining (block generation) on a set of new transaction data. After the mining, a new block 106 is connected to the existing blockchain 104 (details of which will be described later). It can thus be said that the blockchain 104 is a thick transaction ledger recording enormous transaction histories from the past. Any past transition detail can be checked anytime by reference to the blockchain 104. In addition, a normal node 110 can carry out a transaction by using a temporary account, and the anonymity of the transaction is thus protected.

In a case of Bitcoin, an upper limit of the total amount of transaction data that can be written in one block 106 is set (reasons for which will be described later).

Figure 2:
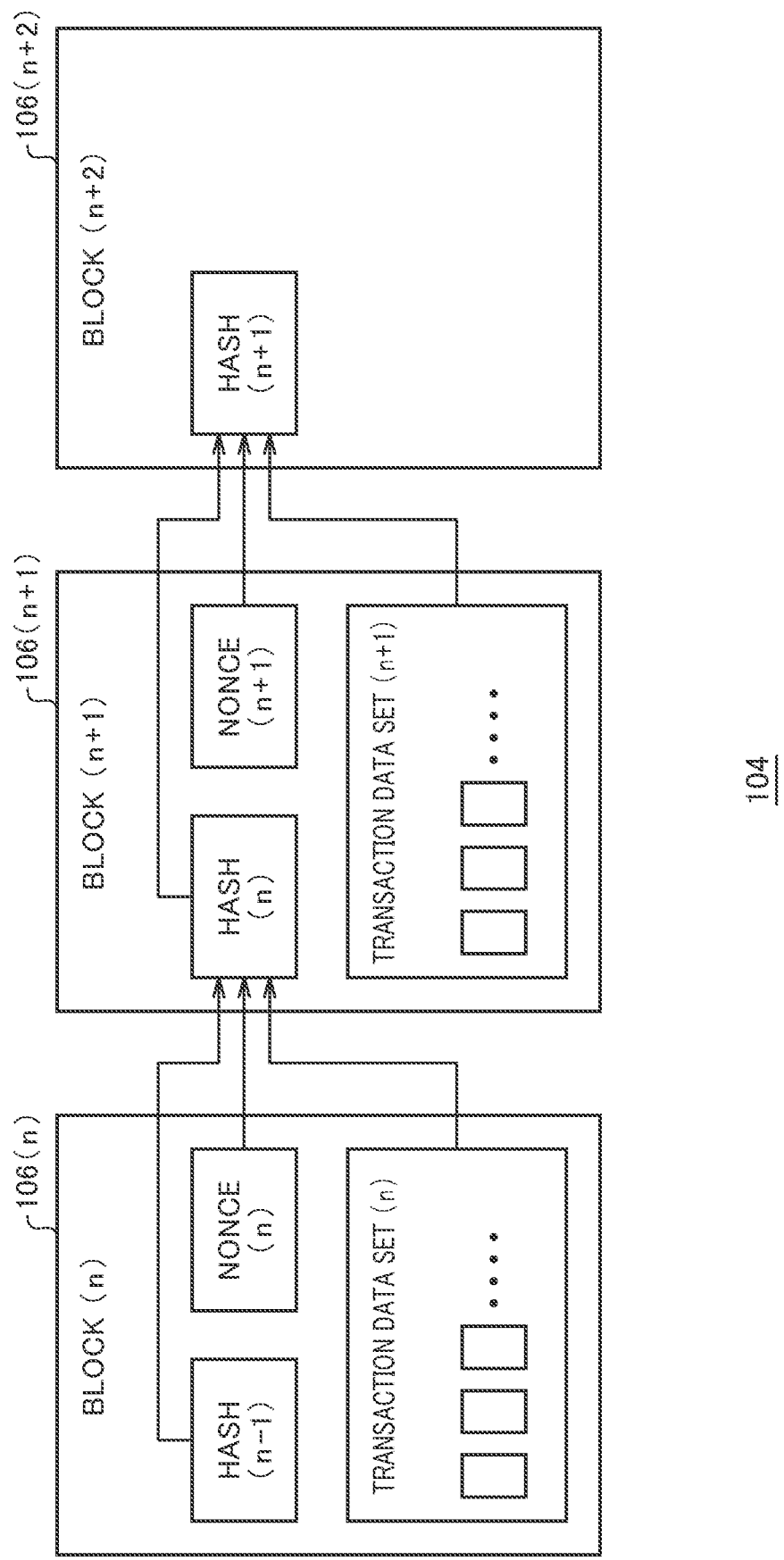
FIG. 2 is a schematic diagram for explaining a mining (block generation) method in the typical blockchain system.

FIG. 2 is a schematic diagram for explaining a mining (block generation) method in the typical blockchain system 100.

A method of block generation (mining) of an (n+1)-th block 106 (hereinafter referred to as a "block 106(n+1)") will now be explained. For generation of the block 106(n+1), a proper hash (n) based on a block 106(n) that is previously generated is used. The block 106(n+1) contains transaction data broadcast by a number of normal nodes 110. Hereinafter, a set of various transaction data to be written in a block 106 will be referred to as a "transaction data set".

The mining nodes 108 calculate a hash (n+1) by a predetermined hash function using a transaction data set (n+1), a hash (n), and a nonce (n+1) as variables. Although an actual hash function includes other variables, a hash function based on the aforementioned three variables is assumed herein for explanation of the principle of the block generation.

The nonce (n+1) is any given value. When the generated hash (n+1) satisfies a predetermined condition, or more specifically, when the generated hash (n+1) is equal to or smaller than a predetermined threshold W, the hash (n+1) is a proper hash. The mining nodes 108 repeat test calculation by injecting various nonces (n+1) into the hash function to find a proper hash. The mining operation for finding a proper hash is, in other words, an operation for searching for a proper nonce. A mining node 108 that has found a proper hash broadcasts the variables including the nonce (n+1) and the hash as a calculation result to the transaction network 102. If the calculation result is confirmed to be correct, the other nodes (the normal nodes 110 and the mining nodes 108) each connect a block (n+1) including the proper nonce (n+1) to the existing blockchain 104. The proper hash (n+1) becomes part of a next block 106(n+2).

If transaction data in the blockchain 104 is falsified afterwards, the hash changes. Because fairly high calculation cost is involved for calculation of proper hashes, it is difficult to rewrite transaction data and all proper hashes based on the rewritten transaction data. Such a system makes tampering with the blockchain 104 practically impossible.

FIG. 3 is a schematic diagram for explaining how a fork occurs in the blockchain system 100.

As described above, a large number of mining nodes 108 compete to search for proper hashes. Because the number of proper hashes that can be found is not only one, the mining nodes 108 can find a plurality of proper hashes. In this case, the blockchain 104 that should be one chain may fork into two branches.

FIG. 3 illustrates a case where two proper hashes (H2A, H2B) are found on the basis of a block 106(2). A block 106(3A) is generated on the basis of a proper hash (H2A) (hereinafter referred to as a "series A"), and a block 106(3B) is generated on the basis of a proper hash (H2B) (hereinafter referred to as a "series B").

In the series A, assume that the block 106(3A) is generated and a block 106(4A) is subsequently generated. In addition, in the series B, assume that a mining node 108x generates, after the block 106(3B), a block 106(4B), a block 106(5B), and a block 106(6B) at a pace faster than in the series A, and broadcasts the four blocks 106 together. Consequently, the series A and the series B are present at the same time. In a case where the mining node 108x has overwhelming computing power, such a "long chain" as the series B can be suddenly input in the transaction network 102.

The blockchain system 100 is operated in accordance with a rule to "officially adopt a longer chain and discard a shorter chain when a fork occurs". In the case of FIG. 3, the transaction data written in the block 106(3A) and the block 106(3B) in the series A are invalidated afterwards. For example, assume that a transactor has had a meal by using a cryptocurrency, and has written transaction data thereof in the block 106(3A). If the block 106(3A) is invalidated afterwards, the payment in the cryptocurrency is deemed not to have been made, which disturbs the order of transactions. In other words, the mining node 108x that has overwhelming computing power can forcibly invalidate transactions in a "short chain" by secretly creating a "longer chain".

In a case of such a popular cryptocurrency as Bitcoin, it is difficult for one miner to overwhelm a large number of miners, and it is thus difficult to input such a "longer chain" afterwards. Although forks are less likely to occur in a popular currency, the possibility of fork occurrence is not zero. In contrast, in a case of a less popular cryptocurrency, the risk of fork occurrence is higher.

In the case of Bitcoin, a system for adjusting mining difficulty so that it takes approximately ten minutes to conduct mining is introduced. For example, as the aforementioned threshold W is smaller, it is more difficult to find a proper hash. This system makes it difficult for one mining node 108 alone to steal a march on the other mining nodes 108 and steadily continue creating blocks 106. Instead, a latency of about ten minutes occurs from input of transaction data until official registration of the transaction data in the blockchain system 100.

In addition, in the case of Bitcoin, an upper limit is set on the total amount (size) of transaction data that can be registered in one block 106. Thus, when transactions are actively carried out, transaction data may not be registered in a current block 106 and may wait until generation of a next or subsequent block in some cases. Hereinafter, the upper limit of the amount of transaction data that can be registered in one block 106 will be referred to as a "transaction upper limit".

Because the blockchain system 100 is not centralized, it is difficult to change the transaction upper limit because of the centralization design. Furthermore, because of the nature of hash functions, as the transaction upper limit is increased, the mining difficulty becomes high. If the mining difficulty is too high, there is a dilemma of hindering common mining nodes 108 only having normal computing power from winning mining competitions.

In summary, in order to avoid a fork or, in other words, to ensure the stability of transaction, some degree of mining difficulty needs to be set. This is to prevent one miner having excellent computing power from stealing a march on the other miners and continuing to generate blocks. If the mining difficulty is too high, however, the smoothness of transactions is impaired. In the case of a popular cryptocurrency such as Bitcoin, the problem of a long latency time from execution of a transaction (remittance) until official registration of the transaction in the blockchain system 100 (hereinafter referred to as "transaction approval") has started to stand out.

FIG. 4 is an outline diagram of a blockchain system 200 according to the present embodiment.

In the blockchain system 200 according to the present embodiment, a single privileged node 120, instead of a large number of mining nodes 108, handles block generation. Normal nodes 110 are connected peer-to-peer via a transaction network 102. The transaction network 102 is the same as that in FIG. 1 in being formed in an open communication network such as the Internet.

A blockchain 104 is formed in the transaction network 102. Data entities of the blockchain 104 are locally saved in each of the normal nodes 110 and the privileged node 120.

In the present embodiment as well, a normal node 110 can perform a transaction by using a temporary account, and the anonymity of the transaction is thus protected. In addition, the transaction upper limit of blocks 106 may be set in the present embodiment as well, but setting of the transaction upper limit is not necessary. In the description below, it is assumed that no transaction upper limit of blocks 106 is set.

The privileged node 120 has a pair of a public key and a secret key. The public key is broadcast to the transaction network 102, and all the normal nodes 110 hold the public key. The normal nodes 110 broadcast transaction data to the transaction network 102, and the privileged node 120 accumulates the transaction data in a local storage area (hereinafter referred to as a transaction pool). The privileged node 120 periodically reads transaction data from the transaction pool and generates a block 106 containing the read transaction data at a rate of once a second, for example. In block generation, the privileged node 120 encrypts part of the data included in the block 106 with the secret key, and generates a signature value (details of which will be described later).

The privileged node 120 broadcasts the block 106 containing the signature value to the transaction network 102. The normal nodes 110 decrypt the signature value in the block 106 with the public key to check the authenticity of the signature value (block 106). When the authenticity is confirmed, the normal nodes 110 adds the new block 106 into the blockchain 104 thereof (transaction approval).

In the present embodiment, instead of the mining nodes 108 competing in mining (searching for proper hashes), only the centralized privileged node 120 generates blocks. Because only the privileged node 120 generates a signature value, the processing cost for block generation is low, which allows generation of blocks 106 at a high rate of about once a second.

Figure 5:
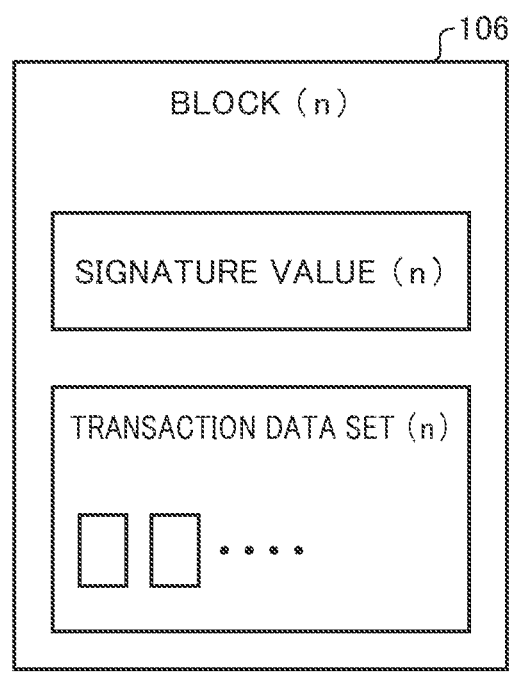
FIG. 5 is a diagram illustrating a data structure of a block according to the embodiment.

FIG. 5 is a diagram illustrating a data structure of a block 106 according to the present embodiment.

A signature value (n) in a block 106(n) is data obtained by encrypting a predetermined part of a transaction data set (n), such as 5-bit data from the 101st to 105th bits, with the secret key. The privileged node 120 and the normal nodes 110 share (make an agreement on) information about which part of transaction data is to be used to generate the signature value in advance. Hereinafter, data for generation of the signature value will be referred to as "original data". The normal nodes 110 obtain the original data from the transaction data set (n) in the block 106(n), and also obtain the signature value (n). The normal nodes 110 decrypt the signature value (n) with the public key and, when the decrypted signature value (n) is coincident with the original data, determine that the block 106(n) is an authentic block 106 generated by the privileged node 120. The confirmation of the signature value corresponds to the transaction approval.

Figure 6:
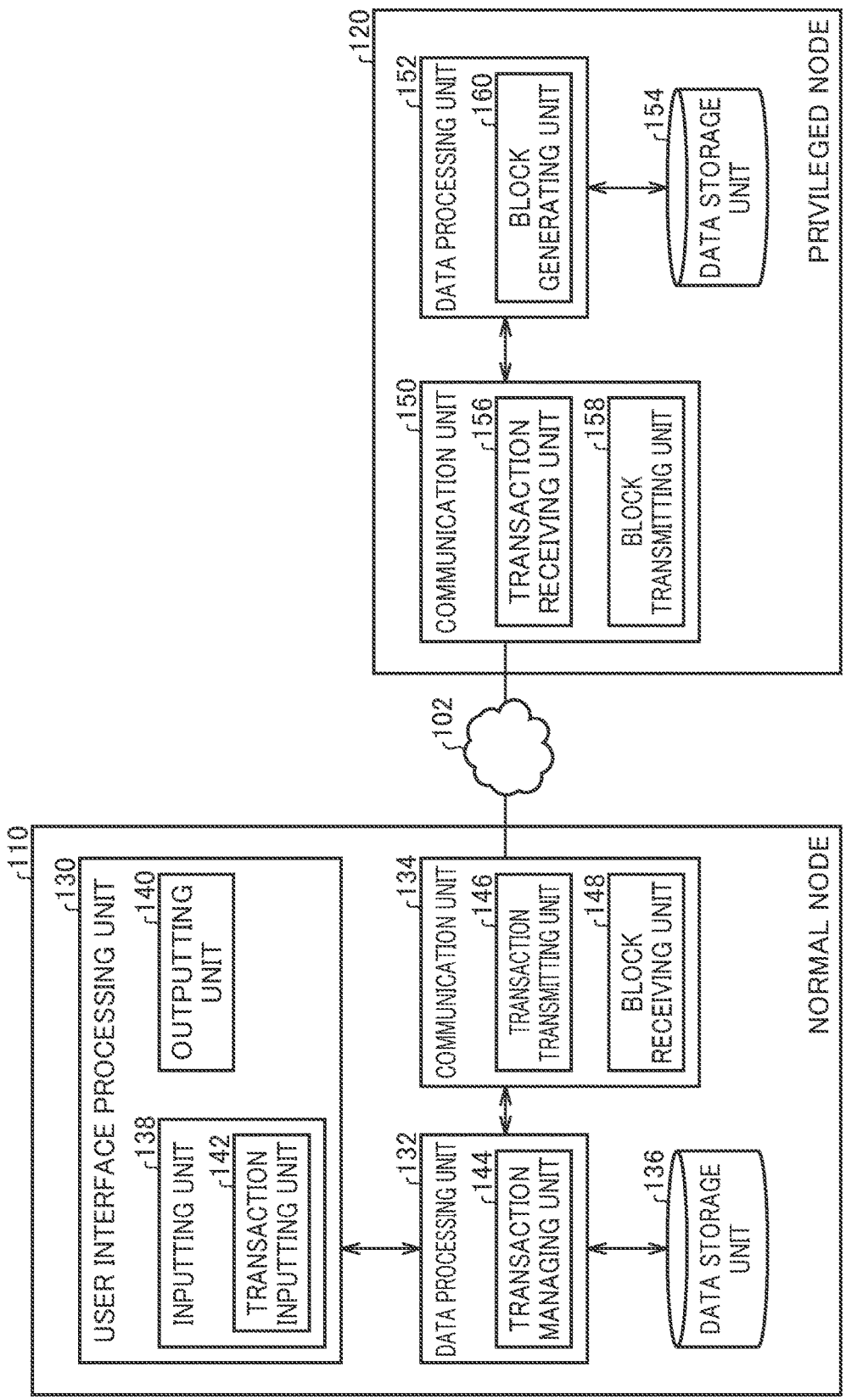
FIG. 6 is a functional block diagram of the blockchain system.

FIG. 6 is a functional block diagram of the blockchain system 200.

As described above, the blockchain system 200 includes a plurality of normal nodes 110 and the privileged node 120.

[Normal Node 110]

Components of each of the normal nodes 110 are implemented by hardware including arithmetic units such as central processing units (CPUs) and various coprocessors, storage devices such as memories and storages, and wire or wireless communication lines connecting the components, and software stored in the storage devices and supplying processing instructions to the arithmetic units. Computer programs may be constituted by device drivers, an Operating System, various application programs on upper layers thereof, and libraries providing common functions to the programs. Blocks described below do not represent components in unit of hardware but represent blocks in units of functions.

The same is applicable to the privileged node 120.

Each normal node 110 includes a user interface processing unit 130, a data processing unit 132, a communication unit 134, and a data storage unit 136.

The communication unit 134 processes communication via the transaction network 102. The user interface processing unit 130 receives operations from a user (transactor), and also performs processing relating to user interface such as image display and audio output. The data storage unit 136 stores various data. The data processing unit 132 performs various processes on the basis of data obtained by the communication unit 134 and the user interface processing unit 130 and data stored in the data storage unit 136. The data processing unit 132 also functions as interfaces for the user interface processing unit 130, the communication unit 134, and the data storage unit 136.

The communication unit 134 includes a transaction transmitting unit 146, and a block receiving unit 148.

The transaction transmitting unit 146 broadcasts transaction data (remittance records) to the transaction network 102. The block receiving unit 148 receives blocks 106 generated by the privileged node 120.

The user interface processing unit 130 includes an inputting unit 138, and an outputting unit 140.

The inputting unit 138 receives various inputs from the user. The outputting unit 140 outputs various information data to the user. The inputting unit 138 includes a transaction inputting unit 142. When a transaction in a cryptocurrency is carried out, the transaction inputting unit 142 receives input of transaction details from the user.

The data processing unit 132 includes a transaction managing unit 144. The transaction managing unit 144 checks the authenticity of each block 106, and updates the blockchain 104.

The data storage unit 136 stores the blockchain 104 and the public key.

[Privileged Node 120]

The privileged node 120 includes a communication unit 150, a data processing unit 152, and a data storage unit 154.

The communication unit 150 processes communication via the transaction network 102. The data storage unit 154 stores various data. The data processing unit 152 performs various processes on the basis of data obtained by the communication unit 150 and data stored in the data storage unit 154. The data processing unit 152 also functions as interfaces for the communication unit 150 and the data storage unit 154.

The data processing unit 152 includes a block generating unit 160. The block generating unit 160 generates block by the method described above.

The communication unit 150 includes a transaction receiving unit 156 and a block transmitting unit 158.

The transaction receiving unit 156 receives transaction data from the transaction network 102, and accumulates the transaction data in the transaction pool, which is a storage area of the data storage unit 154. The block transmitting unit 158 broadcasts generated blocks 106 to the transaction network 102.

The data storage unit 154 stores the blockchain 104 and the secret key. The data storage unit 154 includes the transaction pool formed in a part thereof, in which transaction data are accumulated.

Figure 7:
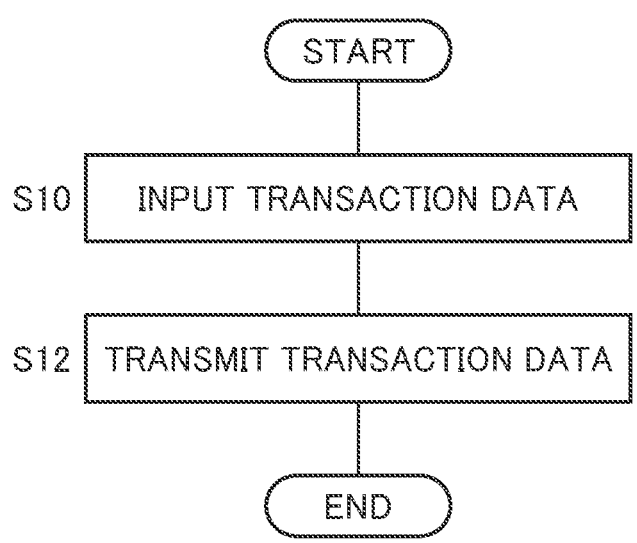
FIG. 7 is a flowchart illustrating a process of inputting transaction data.

FIG. 7 is a flowchart illustrating a process of inputting transaction data.

The process illustrated in FIG. 7 is performed by a normal node 110 when the user carries out a transaction in a cryptocurrency. The transaction inputting unit 142 first receives input of transaction data from the user (S10). The transaction transmitting unit 146 immediately broadcasts the transaction data to the transaction network 102 (S12).

The transaction receiving unit 156 of the privileged node 120 obtains transaction data from a large number of normal nodes 110, and accumulates the obtained transaction data in the transaction pool. In the meantime, the normal nodes 110 that have broadcast the transaction data wait for generation of a block 106 containing the transaction data.

Figure 8:
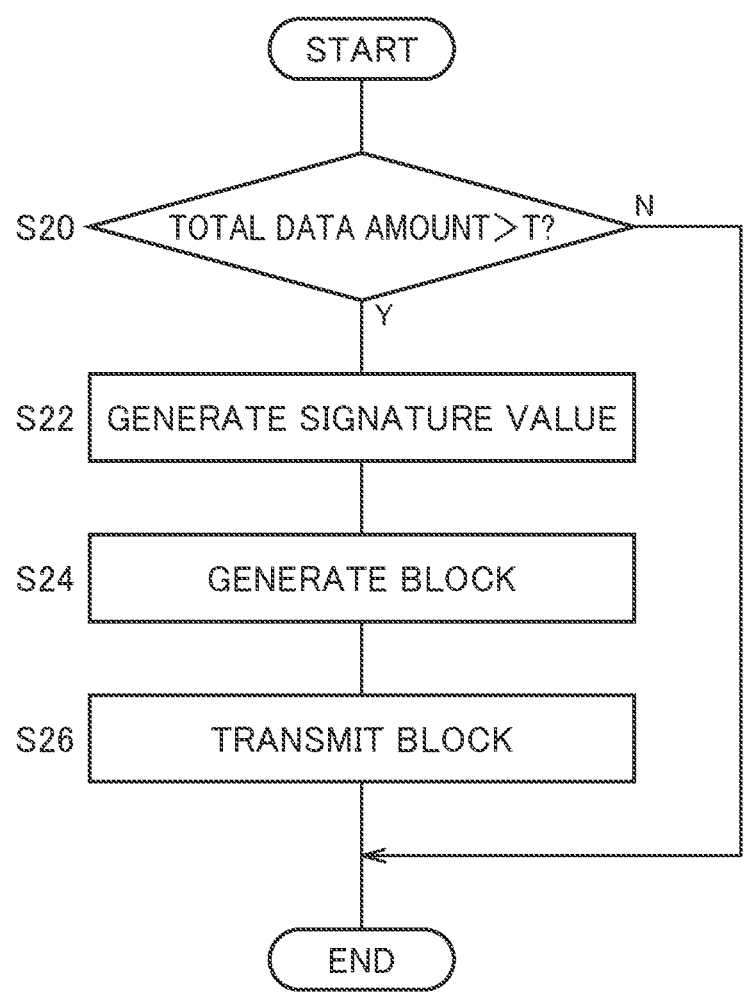
FIG. 8 is a flowchart illustrating a process of block generation.

FIG. 8 is a flowchart illustrating a process of block generation.

In the present embodiment, the block generating unit 160 of the privileged node 120 reads transaction data from the transaction pool (the data storage unit 154) at a rate of once a second. The process illustrated in FIG. 8 is performed at every reading timing (block generation timing).

When the total amount of transaction data accumulated in the transaction pool is equal to or larger than a predetermined threshold T (Y in S20), the block generating unit 160 extracts original data from part of the transaction data set, and encrypts the extracted original data with the secret key to generate a signature value (S22). The block generating unit 160 generates a block 106 containing the signature value and the transaction data set (S24). The block transmitting unit 158 broadcasts the block 106 containing the signature value to the transaction network 102 (S26).

When the total amount of transaction data is smaller than the threshold T (N in S20), the processing in S22 and the subsequent steps is skipped. The block generating unit 160 periodically generates a block 106; when the amount of transaction data accumulated in the transaction pool is not sufficient, however, the block generating unit 160 waits until the next reading timing to generate a block 106. This processing method prevents generation of a block 106 with a small amount of data (hereinafter referred to as a "small block") during slack periods of transactions.

Figure 9:
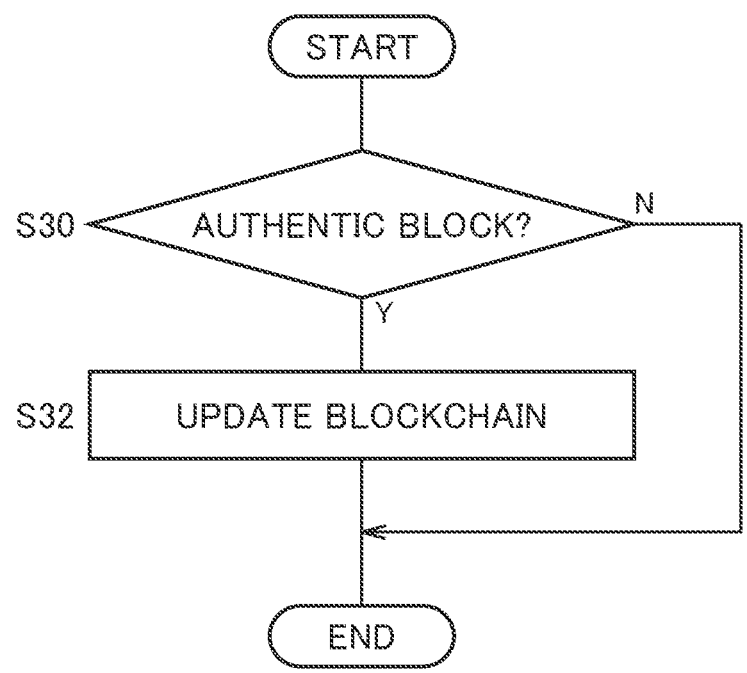
FIG. 9 is a flowchart illustrating a process of processing performed by a normal node upon receiving a block.

FIG. 9 is a flowchart illustrating a process of processing performed by a normal node 110 upon receiving a block.

The block receiving unit 148 of the normal node 110 receives a block 106 broadcast by the privileged node 120. The transaction managing unit 144 decrypts the signature value of the block 106 with the public key, and compares the decrypted signature values with the original data contained in the block 106 to determine whether or not the block 106 is authentic (S30). When the block 106 is authentic (Y in S30), the transaction managing unit 144 approves transactions by adding the block 106 into the blockchain 104 thereof (S32). When the block 106 is not authentic (N in S30), the processing in S32 is skipped. In this case, the transaction managing unit 144 of the normal node 110 may instruct the communication unit 134 to warn the privileged node 120 that a false block 106 is detected.

All the normal nodes 110 update the blockchain 104 on the basis of the received block 106.

Figure 10:
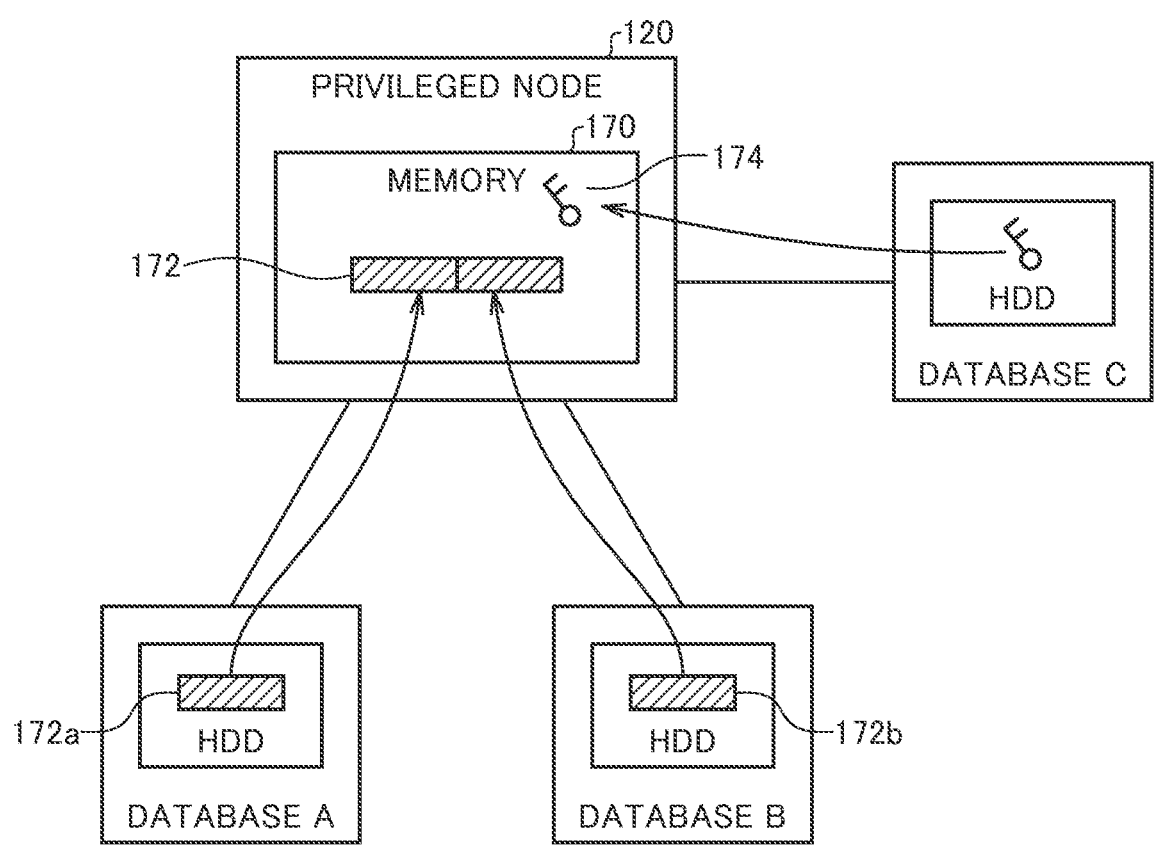
FIG. 10 is a schematic diagram for explaining a method of using a secret key by a privileged node.

FIG. 10 is a schematic diagram for explaining a method of using a secret key 172 by the privileged node 120.

The operation of the blockchain system 200 is based on the feature that only the privileged node 120 holds the secret key 172. If the secret key 172 is illicitly acquired by another node, false blocks 106 may be generated.

In order to protect the confidentiality of the secret key, the privileged node 120 is locally connected with databases A, B, and C. The secret key 172 is first encrypted with a cryptographic key 174. The encrypted secret key 172 is further divided into a first partial key 172a and a second partial key 172b. The first partial key 172a is saved in the database A. The second partial key 172b is saved in the database B. The cryptographic key 174 is saved in the database C. In normal operation, the privileged node 120 holds neither of the secret key 172 and the cryptographic key 174. Thus, in normal operation, neither of the secret key 172 and the cryptographic key 174 is leaked even if the privileged node 120 is improperly accessed.

When a timing for reading transaction data from the transaction pool, that is, a timing for block generation is reached, the block generating unit 160 of the privileged node 120 reads the first partial key 172a from the database A and the second partial key 172b from the database B, and loads the read partial keys into a built-in volatile memory 170. The block generating unit 160 connects the first partial key 172a with the second partial key 172b to generate the secret key 172 in the volatile memory 170. At this point, the secret key 172 is in an encrypted state.

Subsequently, the block generating unit 160 reads the cryptographic key 174 from the database C, and decrypts the secret key 172 in the volatile memory 170 with the cryptographic key 174. The block generating unit 160 generates a signature value on the basis of the decrypted secret key 172. After block generation, the block generating unit 160 erases the secret key 172 from the volatile memory 170. The configuration in which the privileged node 120 holds the secret key 172 only for a moment at a timing for block generation lowers the risk of leakage of the secret key 172 from the privileged node 120.

The databases A, B, and C are each locally connected with the privileged node 120, and are not connected with open communication lines such as the Internet. Thus, improper access to these databases is less likely to occur. In addition, because only parts of the secret key 172 are saved in the databases A and B, the entire secret key 172 is not leaked even if one of the databases is improperly accessed. Furthermore, even if the first partial key 172a and the second partial key 172b are leaked, the secret key 172 cannot be used without the cryptographic key 174.

The database C may hold a plurality of cryptographic keys. For example, a cryptographic key A for decrypting the first partial key 172a and a cryptographic key B for decrypting the second partial key 172b may be provided. In addition, the block generating unit 160 may periodically change a plurality of cryptographic keys.

The privileged node 120 may be connected with the transaction network 102 via a closed communication line. Specifically, the connection may be made via a secret line such as a virtual private network (VPN), or via a dedicated wire line, or a firewall for limiting access to the privileged node 120 from the transaction network 102 may be provided. Such a control method enables more reliable prevention of improper access to the privileged node 120 and the databases A, B, and C.

The blockchain system 200 has been described above with reference to the embodiment.

According to the present embodiment, because blocks 106 are generated by the only privileged node 120, no forks occur. In addition, because the method of generating a signature value with a secret key to generate a block 106 is used, the calculation cost involved in block generation is significantly smaller than that of a typical blockchain 104. In the case of Bitcoin, it normally takes about ten minutes to generate one block 106. According to the blockchain system 200 of the present embodiment, blocks 106 can be generated at a high rate of about once a second, which enables substantially real-time settlement. In addition, because blocks 106 can be generated at a high rate, the total amount of transaction data contained in one block 106 is easily prevented from ballooning.

In the typical blockchain 104, the mining difficulty is controlled as appropriate so that the time for generating one block 106 is about ten minutes. Because the frequency of block generation is statistically determined, the latency time can be longer than ten minutes. In contrast, in the present embodiment, because the privileged node 120 periodically generates blocks, a transactor can more reliably estimate the time from input of transaction data to block generation (authentication of the transaction). In addition, because the transaction upper limit is not set, there is no need to wait until transaction approval.

In a manner similar to the typical blockchain 104, a normal node 110 can conduct a transaction in cryptocurrency by using a temporary account. A transactor need not give his/her identity to the privileged node 120 and the like. Thus, the "anonymity", which is the original appeal of the blockchain 104, is maintained in the blockchain system 200 according to the present embodiment.

The blockchain system 200 according to the present embodiment is not based on the idea of increasing the transaction security by the mining difficulty. Thus, the performance of block generation is not deteriorated without the transaction upper limit. Even during periods in which transactions are actively conducted (busy periods), the privileged node 120 can generate blocks 106 at the same rate as normal. The amount of transaction data contained in one block 106 is small during periods in which transactions are not actively conducted (slack periods), and the amount of transaction data contained in one block 106 is large during busy periods. When large quantities of transactions are conducted in a short period, a large amount of transaction data may be recorded in one block 106. Because the total amount of transaction data that can be registered in a block 106 is variable, the rate of block generation is not affected by the activity level of transactions.

In the case of mining competition of the typical blockchain 104, the calculations performed by the majority of mining nodes 108 that have lost in competitions end up being a waste. Mining involves actual costs such as electricity expense. In the present embodiment, only the privileged node 120 generates blocks, which eliminates wasteful costs involved in mining competitions.

In addition, in the present embodiment, when the total amount of transaction data accumulated in the transaction pool is smaller than the threshold T, block generation is skipped (see FIG. 8). This prevents generation of a small block. The threshold T may be several megabytes or may be zero. With a threshold T of zero, generation of a wasteful block 106 containing no transaction data can be prevented. The typical blockchain 104 has no system for preventing generation of a small block. Small blocks not only cause wasteful delays in remittance but also place unnecessary burden on the transaction network 102. According to the present embodiment, blocks 106 can be generated at a reasonable pace while generation of small blocks is avoided in view of both the smoothness and the activity level of transactions.

In addition to generation of blocks 106, some cost is also involved in checking the signature value (transaction approval) at each of the normal nodes 110. Thus, it takes some time to synchronize the blockchain 104 (blocks 106) among all the normal nodes 110. In this regard as well, it is preferable not only for the generating end (privileged node 120) but also for the receiving end (normal nodes 110) to prevent generation of small blocks.

As described with reference to FIG. 10, the privileged node 120 splits and encrypts the secret key 172 to protect the secret key 172 from improper access. In particular, the secret key 172 is loaded in the volatile memory 170 only during block generation, and erased from the volatile memory 170 upon completion of the block generation, which further improves prevention of leakage of the secret key 172.

The present invention is not limited to the embodiment described above and modifications thereof, and any component thereof can be modified and embodied without departing from the scope of the invention. Components described in the embodiment and modifications can be combined as appropriate to form various other embodiments. Some components may be omitted from the components presented in the embodiment and modifications.

[Modifications]

In the present embodiment, it is assumed that no transaction upper limit of blocks 106 is set. In a modification, a transaction upper limit of about several megabytes to one gigabyte may be set. In a case where block generation (mining) in Bitcoin is assumed to be performed every ten minutes and block generation in the present embodiment is assumed to be once a second, the blockchain system 200 can generate blocks at 600 times the rate in Bitcoin. Thus, even if a relatively small transaction upper limit is set, the latency of block generation and transaction approval can be shortened significantly.

In the present embodiment, it has been described above that transaction data are accumulated in the transaction pool of the privileged node 120, and that the privileged node 120 periodically reads transaction data from the transaction pool and generates a block. In a modification, the privileged node 120 may generate a block 106 each time transaction data are received from any of the normal nodes 110. Alternatively, the privileged node 120 may generate a block when the total amount of transaction data accumulated in the transaction pool becomes a predetermined threshold K or larger. This control method allows automatic adjustment of the block generation timing depending on the activity level of transactions. Blocks will be generated at a high rate in busy periods and at a low rate in slack periods. In addition, this facilitates reduction in variation of the total amount of transaction data contained in one block 106.

In the present embodiment, it has been described that the privileged node 120 adds one signature value to one block 106. In a modification, the privileged node 120 may add a plurality of signature values to one block 106. For example, the block generating unit 160 of the privileged node 120 may generate a first signature value on the basis of first original data from the 101st to 105th bytes, and a second signature value on the basis of second original data from the 1001st to 1005th bytes. In this manner, as the total amount of transaction data is larger, more signature values may be contained. The normal nodes 110 approve transactions on condition that all the signature values are confirmed to be authentic. This control method enables the authenticity of a block 106 to be further reliably proved.

The data processing unit 152 of the privileged node 120 may include a key changing unit (not illustrated) and a key transmitting unit (not illustrated). The key changing unit may periodically change the secret key and the public key. In addition, the key changing unit may periodically change the cryptographic key 174. The key changing unit may change the secret key, etc. when improper access or suspected improper access is detected or in like cases. If a block 106 whose authenticity cannot be confirmed on the basis of the signature value is detected, a normal node 110 may inform the privileged node 120 of the presence of an improper block. In this case, the key changing unit of the privileged node 120 may change the secret key, etc. In addition, the key changing unit of the privileged node 120 may also change the secret key, etc. when the privileged node 120 or the database A, B, or C is accessed from the outside. The databases A, B, and C may each include an access informing unit. Upon detecting access from a device other than the privileged node 120, such as an external device with an IP address other than that of the privileged node 120, the access informing unit may inform the privileged node 120 of the access as improper access. Upon being informed on improper access, the key changing unit of the privileged node 120 may change either both or one of the secret key 172 and the cryptographic key 174. The privileged node 120 may provide a plurality of pairs of secret key/public key, and may change the secret key/public key pair when a condition for changing the keys is satisfied. For changing the keys, the key transmitting unit of the privileged node 120 may broadcast the new public key to be used to the transaction network 102.

Some or all of the databases A, B, and C illustrated in FIG. 10 may be a nonvolatile memory such as a hard disk included in the privileged node 120. Alternatively, the databases may be formed by partitioning a nonvolatile memory in the privileged node 120.

The communication unit 150 of the privileged node 120 may disconnect from the transaction network 102 at the timing of block generation. After disconnecting from the transaction network 102, the privileged node 120 generates a block with transaction data accumulated in the transaction pool through the process described with reference to FIG. 10. After the block generation, the privileged node 120 erases the secret key 172, etc. from the volatile memory 170. After erasure of the secret key 172, the privileged node 120 reconnects with the transaction network 102 and broadcasts the block 106. This control method enables the privileged node 120 to be completely offline while using the secret key 172, which further reduces the risk of leakage of the secret key 172 from the privileged node 120.

In the present embodiment, it has been described that part of the transaction data set is used as original data from which a signature value is created. In a modification, the privileged node 120 may generate certain original data, and generate a signature value from the generated original data. A block 106 only needs to include original data specified by the privileged node 120 and a signature value.

In the present embodiment, it has been described that a block generated by the privileged node 120 is connected to the blockchain 104. In the case of the present embodiment, the connection need not necessarily be a "chain". This is because connection using a proper hash as illustrated in FIG. 2 need not be generated. For example, the privileged node 120 may record the date and time of generation (date and time information) in a block 106, and then broadcast the block 106 to the transaction network 102, and the normal nodes 110 may determine whether or not to officially accept the block 106 upon confirming the authenticity of the signature value. Because a block 106 contains the date and time information, the sequence of transactions can be checked later by reference to the date and time information of a plurality of blocks 106.

The present embodiment has been described as being based on transactions in cryptocurrencies. Transaction data to be registered in a block 106 may, however, relate to transactions other than those in cryptocurrencies. For example, in a case where a transactor A provides a transactor B with an object (a tangible object or an intangible), transaction data thereof may be registered in a block 106. In this case, the transfer of ownership of the object from the transactor A to the transactor B can be confirmed by the blockchain 104. In this manner, the blockchain system 200 is not limited to transactions in cryptocurrencies (money equivalent), and can also be used for management of ownership of objects or information.

The blockchain according to the present embodiment is partly improved as compared with the blockchain described with reference to FIG. 1, etc. Thus, to distinguish from a conventional "blockchain", the "blockchain" of the present embodiment may be called by a different name such as a "block group", a "block list", an "improved blockchain", or "transaction histories".

The blockchain according to the present embodiment need not be a "chain" as described above, but may manage the sequence of arrangement (sequence of generation) of blocks 106.

In one example, each time a block 106 is generated, the block generating unit 160 may contain an ID, which is a sequence number, in the block 106. Specifically, when generating a first block 106(1), the block generating unit 160 sets ID=01 in the block 106(1), and when generating a second block 106(2), the block generating unit 160 sets ID=02 in the block 106(2). This control method enables the normal nodes 110 to confirm the sequence of arrangement of blocks 106 by checking the IDs, which are sequence numbers, contained in the respective blocks 106. The connection of blocks 106 may be expressed by IDs, which are sequence numbers, in this manner.

In another example, in a manner similar to the typical blockchain, a hash may be contained in a block 106 in the blockchain according to the present embodiment. For example, the block generating unit 160 generates a hash (n) from transaction data contained in a block 106(n), and a hash (n+1) from transaction data contained in a next block 106(n+1). The block generating unit 160 also includes the hash (n) in addition to the hash (n+1) into the block 106(n+1). This control method enables the normal nodes 110 to confirm the arrangement of sequence of the blocks 106 by following up the hashes.

As described above, it is desirable that access to the privileged node 120 from the transaction network 102 be limited. This is to prevent leakage of the secret key 172 managed in the privileged node 120. Specifically, the privileged node 120 may completely reject access from any node in the transaction network 102. First, a management node is connected to the transaction network 102, receives transaction data from the normal nodes 110, and temporarily stores the received transaction data. The privileged node 120 periodically accesses the management node to read the transaction data from the management node. Access to the privileged node 120 from the management node or a normal node 110 is, however, rejected. Access to the privileged node 120 from the transaction network 102 may be limited in this manner. Alternatively, a firewall may be provided on a communication line connecting the privileged node 120 with the transaction network 102, to limit the terminals allowed to access the privileged node 120, the time zone during which access to the privileged node 120 is permitted, and the like.

The block generating unit 160 may increase or decrease the aforementioned thresholds T and K on the basis of predetermined control conditions or input of an instruction from a manager. As described above, when the total amount of transaction data is smaller than the threshold T, generation of a block 106 is skipped. In a case where the block generating unit 160 measures the transmission rate in the transaction network 102, and temporarily increase the threshold T during a low-rate state in which the transmission rate is lower than a predetermined value, block generation becomes more likely to be skipped. The decrease in the frequency of block generation while the transmission rate is low reduces the communication load on the transaction network 102. In a case where a block is generated when the total amount of transaction data is equal to or larger than the threshold K, the block generating unit 160 may increase the threshold K while the transmission rate is lower than a predetermined value, by a similar method and for similar reasons.

What is claimed is:

1. A blockchain control method allowing each of a plurality of normal nodes to manage a blockchain generated by a single privileged node in a distributed manner, the blockchains all having same transaction history, the single privileged node having a secret key and a public key associated with the secret key stored therein, the method comprising:
   a step of generating and storing, by the single privileged node, the secret key;
   a step of broadcasting, by the single privileged node, the public key to each of the normal nodes;
   a step of transmitting, by each of the normal nodes, transaction data of a result of a transaction in a cryptocurrency to a transaction network having at least one block;
   a step of accumulating the transaction data transmitted to the transaction network in a transaction pool;
   a step of obtaining, by the single privileged node, one or more of the transaction data from the transaction pool;
   a step of generating, by the single privileged node, a signature value by extracting original data from part of the transaction data, and encrypting the extracted original data with the secret key, the part of the transaction data being of a predetermined size at predetermined position in the block in the transaction network;
   a step of generating, by the single privileged node, a new block containing the transaction data obtained from the transaction pool and the generated signature value;
   a step of broadcasting, by the single privileged node, the generated new block to the transaction network;
   a step of obtaining, by each of the normal nodes, the broadcasted new block;
   a step of checking, by each of the normal nodes, authenticity of the signature value contained in the new block by using the public key received from the single privileged node; and
   a step of connecting, by each of the normal nodes, the obtained new block to a blockchain held by the individual normal nodes on condition that the authenticity of the signature value is confirmed, wherein the single privileged node adjusts timing of new block generation depending on an activity level of transactions.

2. The blockchain control method according to claim 1, wherein the single privileged node periodically reads the transaction data accumulated in the transaction pool, and generates the new block of a variable size depending on a data size of the read transaction data.

3. The blockchain control method according to claim 2, wherein the single privileged node sets a predetermined threshold of a data size of the transaction data to be used to generate the new block and, when a data size of the transaction data read from the transaction pool is smaller than the predetermined threshold, skips generation of the new block.

4. The blockchain control method according to claim 1, wherein
   the secret key is saved in an encrypted state in a nonvolatile memory of the single privileged node, and
   the single privileged node reads the secret key from the nonvolatile memory into a volatile memory, decrypts the secret key in the volatile memory, then generates the signature value, and erase the secret key from the volatile memory after generation of the new block.

5. The blockchain control method according to claim 1, wherein
   the secret key is divided into a plurality of parts, the parts being individually saved in a plurality of nonvolatile memories of the single privileged node, and
   the single privileged node reads the parts of the secret key from the nonvolatile memories into a volatile memory to form the secret key, then generates the signature value, and erases the secret key from the volatile memory after generation of the new block.

6. The blockchain control method according to claim 1, further comprising:
   a step of changing, by the single privileged node, the secret key when a predetermined changing condition is satisfied; and
   a step of broadcasting, by the single privileged node, a new public key associated with the changed secret key resulting from the change to the transaction network.

7. The blockchain control method according to claim 6, wherein
   the secret key is saved in a nonvolatile memory of the single privileged node, and
   upon detecting access to the nonvolatile memory from a communication terminal other than the single privileged node, the single privileged node changes the secret key.

* * * * *